United States Patent
Xiao et al.

(10) Patent No.: US 9,653,775 B2
(45) Date of Patent: May 16, 2017

(54) MICROWAVE ANTENNA ADJUSTMENT APPARATUS

(71) Applicant: Huawei Technologies Co., Ltd., Shenzhen, Guangdong (CN)

(72) Inventors: Shanghong Xiao, Shenzhen (CN); Fangrong Jiang, Shenzhen (CN); Youhe Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 14/522,161

(22) Filed: Oct. 23, 2014

(65) Prior Publication Data

US 2015/0034785 A1    Feb. 5, 2015

Related U.S. Application Data

(63) Continuation of application No. PCT/CN2013/070739, filed on Jan. 18, 2013.

(30) Foreign Application Priority Data

Aug. 6, 2012 (CN) .......................... 2012 1 0277132

(51) Int. Cl.
*H01Q 1/12* (2006.01)
*H01Q 3/08* (2006.01)
*F16M 13/02* (2006.01)
*H01Q 3/04* (2006.01)
*H01Q 3/20* (2006.01)
*H01Q 3/18* (2006.01)

(52) U.S. Cl.
CPC .............. *H01Q 1/125* (2013.01); *F16M 13/02* (2013.01); *H01Q 1/1228* (2013.01); *H01Q 1/1242* (2013.01); *H01Q 1/1264* (2013.01); *H01Q 3/04* (2013.01); *H01Q 3/08* (2013.01); *H01Q 3/18* (2013.01); *H01Q 3/20* (2013.01)

(58) Field of Classification Search
CPC ...................................................... H01Q 1/125
See application file for complete search history.

(56) References Cited

U.S. PATENT DOCUMENTS

| | | | | | |
|---|---|---|---|---|---|
| 2,581,123 | A | * | 1/1952 | Merkle ................ | G05G 7/10 184/6.18 |
| 5,835,068 | A | * | 11/1998 | Paul ..................... | H01Q 3/08 343/757 |
| 6,262,691 | B1 | * | 7/2001 | Austin ................ | H01Q 1/1221 343/878 |
| 6,407,713 | B1 | * | 6/2002 | Mallenius .......... | F16M 11/10 343/765 |

(Continued)

FOREIGN PATENT DOCUMENTS

CN    201910488 U    7/2011
CN    201956460 U    8/2011
(Continued)

*Primary Examiner* — Stanton L Krycinski
*Assistant Examiner* — Chiedu Chibogu

(57) ABSTRACT

Embodiments of the present invention disclose a microwave antenna adjustment apparatus, which relates to the field of communications technologies and is invented for resolving a problem that an existing adjustment apparatus has a low horizontal adjustment precision and is costly. The present invention is applicable to adjustment of a microwave antenna.

10 Claims, 4 Drawing Sheets

(56) References Cited

U.S. PATENT DOCUMENTS

| | | | |
|---|---|---|---|
| 6,485,085 B1 | 11/2002 | Pecho et al. | |
| 6,559,805 B2 * | 5/2003 | Yamauchi | H01Q 3/08 |
| | | | 343/765 |
| 6,914,578 B1 | 7/2005 | Menahem | |
| 7,050,012 B2 * | 5/2006 | Chen | H01Q 19/132 |
| | | | 343/757 |
| 7,265,732 B2 * | 9/2007 | Lin | H01Q 1/125 |
| | | | 343/878 |
| 8,020,824 B2 * | 9/2011 | Pan | F16M 11/08 |
| | | | 248/222.51 |
| 2007/0241979 A1 * | 10/2007 | Yang | H01Q 1/246 |
| | | | 343/765 |
| 2010/0292845 A1 * | 11/2010 | Burdette | H01Q 3/04 |
| | | | 700/275 |
| 2013/0221182 A1 * | 8/2013 | Renilson | H01Q 1/1228 |
| | | | 248/534 |

FOREIGN PATENT DOCUMENTS

| | | | | |
|---|---|---|---|---|
| CN | 102439788 A | 5/2012 | | |
| DE | 3709679 A1 * | 10/1988 | | H01Q 1/125 |
| DE | 202007013622 U1 | 1/2008 | | |
| WO | WO 02/075847 A1 | 9/2002 | | |

* cited by examiner

MICROWAVE ANTENNA ADJUSTMENT APPARATUS

CROSS-REFERENCE TO RELATED APPLICATIONS

This application is a continuation of International Application No. PCT/CN2013/070739, filed on Jan. 18, 2013, which claims priority to Chinese Patent Application No. 201210277132.X, filed on Aug. 6, 2012, both of which are hereby incorporated by reference in their entireties.

TECHNICAL FIELD

The present invention relates to the field of communications technologies, and in particular, to a microwave antenna adjustment apparatus.

BACKGROUND

Microwave transmission is a widely used communication transmission manner. The microwave transmission requires a pair of microwave antennas for signal transmission. Therefore, to select microwave transmission, pairs of microwave antennas must be installed. A microwave antenna is generally pole-mounted on a tower or a rooftop. Therefore, complex operations such as installation at heights and antenna alignment are involved. The antenna alignment is categorized into coarse adjustment and fine adjustment. The coarse adjustment is to find signals. After the signals are found, fine adjustment is performed, which is to regulate the signals to comply with indicator values. After the fine adjustment is complete, the position of the antenna needs to be maintained unchanged, and the antenna is fastened. The alignment task is now complete.

A solution in the prior art for the fine adjustment of the microwave antenna is providing a hanger that has an adjustment function. The microwave antenna is mounted on the hanger, and installation personnel adjust a horizontal adjustment bolt and a pitching adjustment bolt on the hanger to drive the microwave antenna that is fastened on the hanger, thereby enabling the microwave antenna to horizontally rotate and rotate in a pitching manner. However, during the adjustment, angle adjustment is generally implemented by manually pulling the adjustment bolt. A precision of manual adjustment is low and movement occurs during the fastening. Therefore, repeated adjustment and fastening are required.

Another technical solution in the prior art is designing a hanger on which a worm and gear mechanism is mounted. The microwave antenna is fastened on the hanger. A horizontal adjustment handle is rotated when adjusting a horizontal azimuth angle, and a pitching adjustment handle is rotated when adjusting a pitching angle. However, although the adjustment precision may be improved by using the worm and gear mechanism, each hanger requires one worm and gear mechanism, thereby increasing material costs.

SUMMARY

Embodiments of the present invention provide a microwave antenna adjustment apparatus, to reduce adjustment costs based on the premise that a horizontal adjustment precision is met.

To achieve the foregoing objective, the embodiments of the present invention adopt the following technical solutions:

A microwave antenna adjustment apparatus includes a hoop that is permanently mounted on a base and a hanger to which the microwave antenna is mounted, where the hoop is hinged to the hanger by using a first hinged shaft.

The microwave antenna adjustment apparatus further includes an adjustment mechanism, where the adjustment mechanism includes a first bracket and a second bracket, where the first bracket is hinged to the second bracket by using a second hinged shaft, the first bracket is detachably connected to the hoop, and the second bracket is detachably connected to the hanger; a worm is disposed on the second bracket, and a worm gear cooperating with the worm is permanently connected to the first bracket; and a driving mechanism is disposed on the second bracket, where the driving mechanism is used for driving the worm to rotate so that the worm drives the worm gear to rotate.

Specifically, the driving mechanism includes a first gear and a second gear that mesh with each other, where the first gear is coaxially and permanently connected to the worm, and the second gear is connected to a hand-operated handle that drives the second gear.

Preferably, a screw permanently connected to the hanger is further disposed on the second bracket.

Optionally, the second bracket is connected, by using a bolt, to or fastened to the hanger.

In addition, a positioning hole is disposed on the hoop, and a positioning pin cooperating with the positioning hole is disposed on the first bracket.

Optionally, the hoop is connected, by using a bolt, to or fastened to the first bracket.

Further, the microwave antenna adjustment apparatus further includes a clamp nut and a threaded rod cooperating with the clamp nut, where one end of the threaded rod is hinged to the hanger, and the other end is connected to the hoop by using the clamp nut.

Further, a through hole is disposed on the hoop, the threaded rod penetrates through the through hole, and the clamp nut includes a first clamp nut and a second clamp nut, where the first clamp nut and the second clamp nut are separately located on two sides of the through hole.

The second gear is detachably connected to the hand-operated handle, and the hand-operated handle is further configured to drive a pitching adjustment nut on the hanger to rotate.

According to the microwave antenna adjustment apparatus provided by the embodiments of the present invention, during adjustment of the microwave antenna, the second bracket of the adjustment mechanism is connected to the hanger, and the first bracket is connected to the hoop. The worm cooperates with and is connected to the worm gear, and the hoop is generally connected to the base permanently. Therefore, the first bracket is fixed as opposed to the base. In this way, eventually, the second bracket rotates within a horizontal plane as opposed to the first bracket, and drives the microwave antenna that is connected to the hanger to rotate within the horizontal plane, thereby completing horizontal adjustment of the microwave antenna. After position adjustment is completed for the microwave antenna, the adjustment mechanism may be removed instead of permanently staying at heights. This extends a service life of the adjustment mechanism, reduces the number of adjustment mechanisms, and reduces costs. In addition, because the worm and worm mechanism is a high-precision linear adjustment mechanism, during horizontal adjustment of the microwave antenna, the adjustment process is a linearly changing process, microwave signals continuously change with no shift, and therefore the adjustment precision is high.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
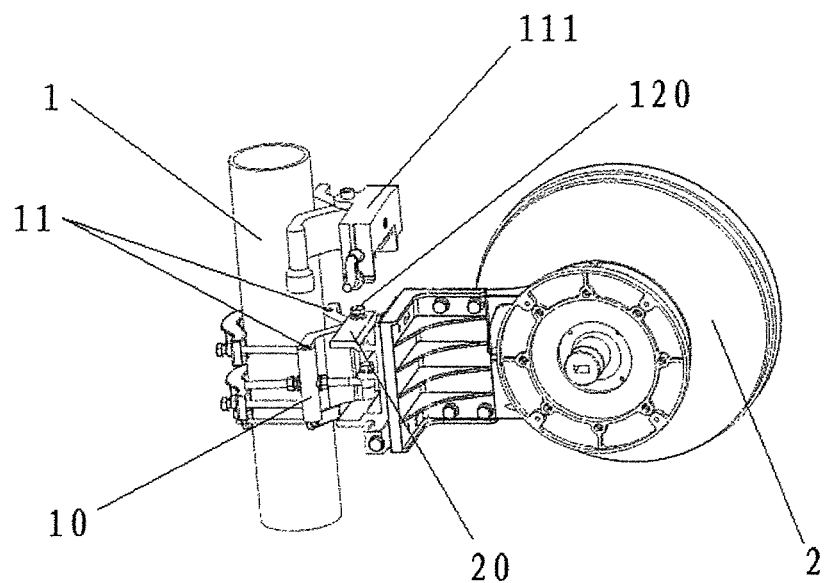
FIG. 1 is a schematic structural diagram of a microwave antenna adjustment apparatus according to an embodiment of the present invention.
Figure 2:
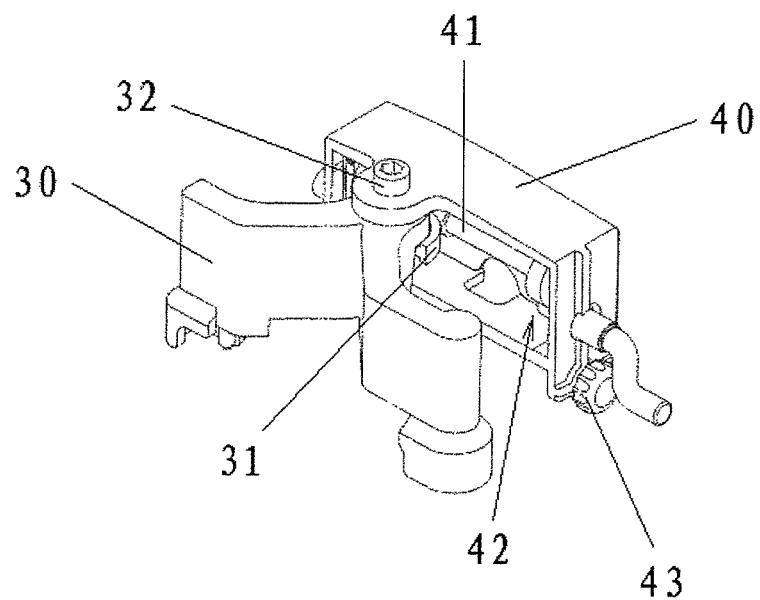
FIG. 2 is a schematic structural diagram of an adjustment mechanism shown in FIG. 1.
Figure 3:
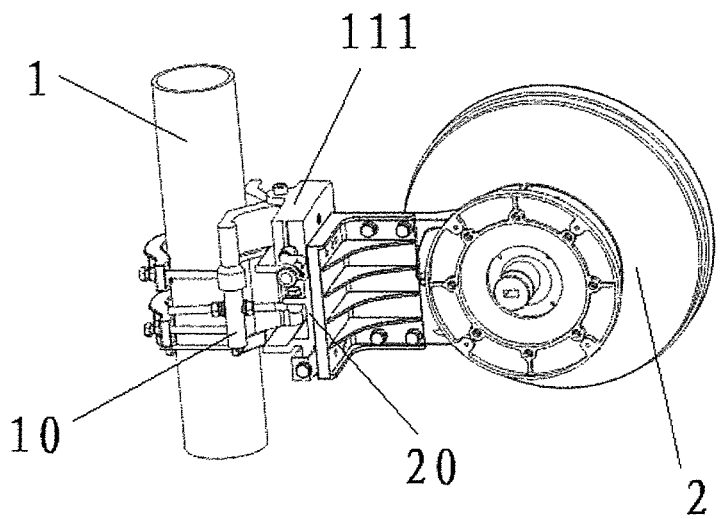
FIG. 3 is a schematic diagram, from another angle view of view, of a microwave antenna adjustment apparatus according to an embodiment of the present invention.

As shown in FIG. 1, FIG. 2, and FIG. 3, a specific embodiment illustrating a microwave antenna adjustment apparatus provided by the present invention is given. The microwave antenna adjustment apparatus includes a hoop 10 that is permanently mounted on a base 1, and a hanger 20 to which a microwave antenna 2 is mounted. The hoop 10 is hinged to the hanger 20 by using a first hinged shaft 120.

The microwave antenna adjustment apparatus further includes an adjustment mechanism 111. The adjustment mechanism 111 includes a first bracket 30 and a second bracket 40. The first bracket 30 is hinged to the second bracket 40 by using a second hinged shaft 32, the first bracket 30 is detachably connected to the hoop 10, and the second bracket 40 is detachably connected to the hanger 20.

A worm 41 is disposed on the second bracket 40, and a worm gear 31 cooperating with the worm 41 is permanently connected to the first bracket 30. A driving mechanism 42 is further disposed on the second bracket 40, where the driving mechanism 42 is used for driving the worm 41 to rotate so that the worm 41 drives the worm gear 31 to rotate.

According to the microwave antenna adjustment apparatus provided by this embodiment of the present invention, during adjustment of the microwave antenna, the second bracket 40 of the adjustment mechanism 111 is connected to the hanger 20, and the first bracket 30 is connected to the hoop 10. The worm 41 cooperates with and is connected to the worm gear 31, and the hoop 10 is generally connected to the base 1 permanently. Therefore, the first bracket 30 is fixed as opposed to the base 1. In this way, eventually, the second bracket 40 rotates within a horizontal plane as opposed to the first bracket 30, and drives the microwave antenna 2 that is connected to the hanger 20 to rotate within the horizontal plane, thereby completing horizontal adjustment of the microwave antenna. After position adjustment is completed for the microwave antenna 2, the adjustment mechanism 111 may be removed instead of permanently staying at heights. This extends a service life of the adjustment mechanism 111, reduces the number of adjustment mechanisms 111, and reduces costs.

In addition, because the worm and gear mechanism is a high-precision linear adjustment mechanism, during horizontal adjustment of the microwave antenna, the adjustment process is a linearly changing process, microwave signals continuously change with no shift, and therefore the adjustment precision is high. Therefore, this embodiment of the present invention resolves a problem that an existing adjustment apparatus has a low horizontal adjustment precision and is costly.

With respect to the foregoing embodiment, it should be noted that the worm and gear mechanism is preferably a worm and gear mechanism having a self-locking function. That is, only the worm drives the worm gear to rotate, and after adjustment to a desired position, other auxiliary positioning tools are not required; and the adjusted position is maintained in a stable state. Therefore, adjustment stability is higher.

Figure 4:
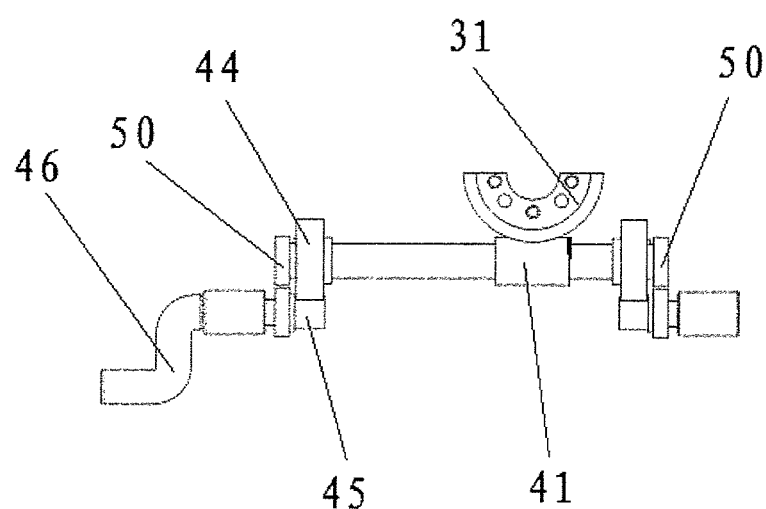
FIG. 4 is a schematic structural diagram of a worm and gear mechanism shown in FIG. 2.

Specifically, as shown in FIG. 4, the driving mechanism includes a first gear 44 and a second gear 45 that mesh with each other, where the first gear 44 is coaxially and permanently connected to the worm 41, and the second gear 45 is connected to a hand-operated handle 46 that drives the second gear 45. In this way, the second gear 45 may be driven, by rotating the hand-operated handle 46, to rotate, and to further drive the first gear 44 to rotate. Eventually, the worm gear 31 is driven by the worm 41 to rotate. Generally, the second gear 45 serving as a driving gear is a small-diameter gear, whereas the first gear 44 serving as a driven gear is a large-diameter gear. In this way, cooperation of the first gear 44 and the second gear 45 is equivalent to a reduction mechanism, which may implement uniform linear actuation. In other embodiments of the present invention, other tools may be used to drive the second gear 45 to rotate or motor driving may be used for the entire driving mechanism.

Preferably, as shown in FIG. 1, a screw 43 permanently connected to the hanger 20 is further disposed on the second bracket 40. The second bracket 40 may be permanently connected to the hanger 20 by using a common mechanical connection, for example, a screw and a bolt. Alternatively, the second bracket 40 may be designed as a certain structure that is directly fastened to the hanger. Still alternatively, as readily figured out by a person skilled in the art, the second bracket 40 may be detachably connected to the hanger 20 by using another mechanical connection manner.

Figure 5:
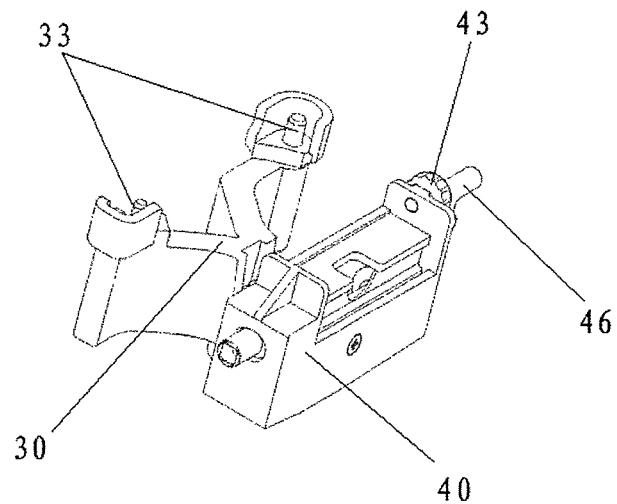
FIG. 5 is a schematic diagram, from another angle of view, of an adjustment mechanism shown in FIG. 1.

Preferably, as shown in FIG. 1 and FIG. 5, a positioning hole 11 is disposed on the hoop 10, and a positioning pin 33 cooperating with the positioning hole 11 is disposed on the first bracket 30. In this way, the first bracket 30 is precisely and permanently connected to the hoop 10, so that no relative motion occurs between the first bracket 30 and the hoop 10. In addition, the positioning pin 33 cooperates with and is connected to the positioning hole 11, facilitating operations. That is, the positioning pin is inserted for use, and is removed if not used. The present invention is not limited thereto. The first bracket 30 and the hoop 10 may use another positioning manner, for example, connecting by using a screw or a bolt, or fastening. Alternatively, the first bracket 30 may not be directly connected to the hoop 10, but may be only supported on the hoop 10, and the first bracket 30 is designed as a structure capable of holding the base (for example, a pole) as long as no relative motion occurs between the first bracket 30 and the base.

Figure 6:
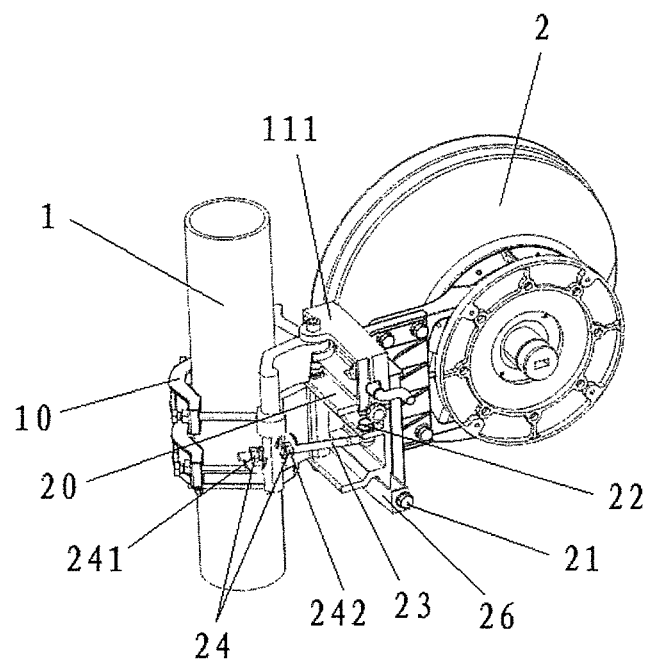
FIG. 6 is a schematic diagram, from another angle of view, of a microwave antenna adjustment apparatus according to an embodiment of the present invention.

Further, as shown in FIG. 6, the microwave antenna adjustment apparatus further includes a clamp nut 24 and a threaded rod 23 cooperating with the clamp nut 24, where one end of the threaded rod 23 is hinged to the hanger 20 by using a third hinged shaft 22, and the other end is connected to the hoop 10 by using the clamp nut 24. In this way, during position adjustment of the microwave antenna, the clamp nut 24 is released so that the hanger 20 rotates within the horizontal plane as opposed to the hoop 10. After the adjustment is complete, the clamp nut 24 is tightened to implement relative and fixed connection between the hanger 20 and the hoop 10, thereby implementing fastening of the microwave antenna 2.

Preferably, as shown in FIG. 6, a through hole is disposed on the hoop 10, the threaded rod 23 penetrates through the through hole, and the clamp nut 24 includes a first clamp nut 241 and a second clamp nut 242, where the first clamp nut 241 and the second clamp nut 242 are separately located on two sides of the through hole. In this way, when the microwave antenna 2 needs to be clockwise adjusted, the second clamp nut 242 is released so that the hanger 20 is capable of clockwise rotating; when the microwave antenna 2 needs to be counterclockwise rotated, the first clamp nut 241 is released so that the hanger 20 is capable of counterclockwise rotating. After the adjustment is complete, the correspondingly released clamp nut is tightened to implement fastening of the microwave antenna.

As shown in FIG. 6, the second gear 45 is detachably connected to the hand-operated handle 46, and the hand-operated handle 46 may be further configured to drive a pitching adjustment nut 21 on the hanger 20 to rotate. The pitching adjustment nut 21 may cooperate with the hand-operated handle 46. In this way, during pitching angle adjustment of the microwave antenna 2, the hand-operated handle 46 may be used, and no other dedicated adjustment tools are required. Certainly, other tools or manual adjustment may also be used.

Figure 7:
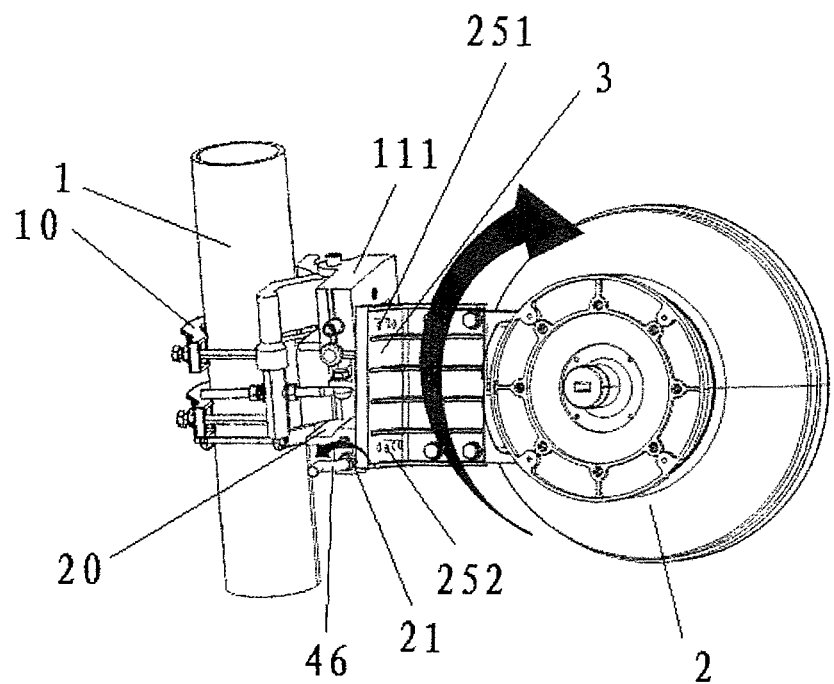
FIG. 7 is a schematic diagram, from another angle of view, of a microwave antenna adjustment apparatus according to an embodiment of the present invention.

In this embodiment, as shown in FIG. 6 and FIG. 7, a U-shaped metal sheet 26 is disposed on the lower end of the hanger 20, the pitching adjustment nut 21 penetrates through an end-portion through hole of the U-shaped metal sheet 26, a certain radial gap is arranged between the end-portion through hole and the pitching adjustment nut 21, an adjustment threaded hole (not shown in the drawings) that matches the pitching adjustment nut 21 is disposed on the hanger 20, and when the pitching adjustment nut 21 is rotated, the lower end of the hanger 20 slides along a U-shaped groove as opposed to the U-shaped metal sheet 26. An upper threaded hole 251 and a lower threaded hole 252 are separately disposed on upper and lower ends of an installation plate 3 of the microwave antenna 2, a threaded through hole corresponding to the upper threaded hole 251 is disposed on the upper end of the hanger 20, and a first screw (not shown in the drawings) penetrates through the threaded through hole and the upper threaded hole. Corresponding punch holes (not shown in the drawings) are disposed on plates on the two sides of the U-shaped metal sheet 26, the position of the punch hole corresponds to the lower threaded hole 252 of the installation plate 3, and a second screw (not shown in the drawings) is inserted into the corresponding punch hole on the plate on one side and the lower threaded hole 252. In this way, when the pitching adjustment nut 21 is rotated, due to the gap between the end-portion through hole and the pitching adjustment nut 21, the U-shaped metal sheet 26 may move forward and backward, and rotate at a small amplitude, so that the installation plate 3 connected thereto is driven to rotate around the first screw and the second screw, thereby implementing adjustment of the pitching angle of the microwave antenna 2.

During the pitching adjustment of the microwave antenna, the pitching adjustment nut is used because fine adjustment of the microwave antenna is mainly horizontal adjustment and the adjustment of the pitching angle is relatively simpler. Therefore, the worm and gear mechanism is not used during the adjustment of the pitching angle. In this way, the structure of the adjustment apparatus is simplified, and costs are reduced.

An adjustment process of the microwave antenna adjustment apparatus provided by this embodiment of the present invention is described with reference to FIG. 1 to FIG. 7.

101. Fasten the first bracket 30 of the adjustment mechanism 111 on the hoop 10 by means of cooperation between the positioning pin 33 and the positioning hole 11.

102. Tighten the screw 43 on the second bracket 40 of the adjustment mechanism 111, so that the second bracket 40 is permanently connected to the hanger 20.

103. Release the first clamp nut 251 or the second clamp nut 252 on the threaded rod 23 as required.

104. Rotate the hand-operated handle 46 so that the hanger 20, under driving of the second bracket 40, clockwise rotates or counterclockwise rotates, thereby implementing horizontal positioning.

105. Tighten the first clamp nut 251 or the second clamp nut 252 to implement fastening of the microwave antenna 2.

106. Remove the hand-operated handle 46 from the adjustment mechanism 111, and then sleeve the hand-operated handle 46 on the pitching adjustment nut 21 of the hanger 20; and rotate the hand-operated handle 46 to implement pitching adjustment of the microwave antenna 2.

107. After the adjustment of the microwave antenna is complete, release the screw 43, and remove the adjustment mechanism 111.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A microwave antenna adjustment apparatus, comprising:
  a hoop and a hanger to which a microwave antenna is mounted, wherein the hoop is hinged to the hanger by using a first hinged shaft;
  an adjustment mechanism comprising, a first bracket and a second bracket, wherein the first bracket is hinged to the second bracket by using a second hinged shaft, the first bracket is detachably connected to the hoop, and the second bracket is detachably connected to the hanger;
  a worm disposed on the second bracket;
  a worm gear cooperating with the worm and permanently connected to the first bracket; and a driving mechanism disposed on the second bracket, wherein the driving mechanism is used for driving the worm to rotate so that the worm drives the worm gear to rotate.

2. The microwave antenna adjustment apparatus according to claim 1, wherein the driving mechanism comprises a first gear and a second gear that mesh with each other, wherein the first gear is coaxially and permanently connected to the worm, and the second gear is connected to a hand-operated handle that drives the second gear.

3. The microwave antenna adjustment apparatus according to claim 1, wherein a screw permanently connected to the hanger is further disposed on the second bracket.

4. The microwave antenna adjustment apparatus according to claim 1, wherein the second bracket is fastened to the hanger using a bolt.

5. The microwave antenna adjustment apparatus according to claim 1, wherein a positioning hole is disposed on the hoop, and a positioning pin cooperating with the positioning hole is disposed on the first bracket.

6. The microwave antenna adjustment apparatus according to claim 1, wherein the hoop is fastened to the first bracket using a bolt.

7. The microwave antenna adjustment apparatus according to claim 1, further comprising at least one clamp nut and a threaded rod cooperating with the at least one clamp nut, wherein one end of the threaded rod is hinged to the hanger, and the other end is connected to the hoop by using the at least one clamp nut.

8. The microwave antenna adjustment apparatus according to claim 7, wherein a through hole is disposed on the hoop, the threaded rod penetrates through the through hole, and the at least one clamp nut comprises a first clamp nut and a second clamp nut, wherein the first clamp nut and the second clamp nut are separately located on two sides of the through hole.

9. The microwave antenna adjustment apparatus according to claim 2, wherein the second gear is detachably connected to the hand-operated handle, and the hand-operated handle is further configured to drive a pitching adjustment nut on the hanger to rotate.

10. The microwave antenna adjustment apparatus according to claim 1, wherein the adjustment mechanism, with the worm and driving mechanism, is removable from the remainder of the microwave antenna adjustment apparatus when not in use.

* * * * *